United States Patent
Drudis et al.

(10) Patent No.: US 7,957,511 B2
(45) Date of Patent: Jun. 7, 2011

(54) PROVIDING NETWORK SERVICES TO A NETWORK AGENT

(75) Inventors: Antoni Drudis, Cupertino, CA (US); Paul A. Serra, Nashua, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1275 days.

(21) Appl. No.: 11/436,363

(22) Filed: May 18, 2006

(65) Prior Publication Data

US 2007/0269029 A1    Nov. 22, 2007

(51) Int. Cl.
*H04M 3/42*    (2006.01)
*H04M 11/00*    (2006.01)

(52) U.S. Cl. ......... 379/201.01; 379/201.02; 379/201.05; 455/405; 455/407

(58) Field of Classification Search ............. 379/201.01, 379/201.05, 201.02, 207.02; 455/557, 405, 455/407, 414.1; 709/229
See application file for complete search history.

(56) References Cited

U.S. PATENT DOCUMENTS

| | | | |
|---|---|---|---|
| 5,854,975 A | 12/1998 | Fougnies | |
| 6,157,823 A | 12/2000 | Fougnies | |
| 6,236,851 B1 | 5/2001 | Fougnies | |
| 2001/0021648 A1 | 9/2001 | Fougnies | |
| 2002/0058532 A1* | 5/2002 | Snelgrove et al. | 455/557 |
| 2003/0084171 A1* | 5/2003 | de Jong et al. | 709/229 |

OTHER PUBLICATIONS

By: Nostocksonlybonds, Long-Term Sentiment: Hold, May 20, 2005, Msg: 8520 of 8533.

* cited by examiner

*Primary Examiner* — Thjuan K Addy

(57) ABSTRACT

In a communications network, data that establishes a network agent's entitlement to network services is stored within the network agent and not within the network. Network services are provided to the network agent by storing network service authorization information and network service usage allowance information within a network agent, which the network agent transmits to the network when network service is requested. The network does not store an account balance for the network agent but instead stores authorization information and actual network service usage information for the network agent.

29 Claims, 3 Drawing Sheets

PROVIDING NETWORK SERVICES TO A NETWORK AGENT

BACKGROUND

Wireless communication networks have become nearly ubiquitous and the demand for the wireless services they provide continues to grow. In addition to providing basic two-way voice communications, wireless networks also now provide text messaging, Internet access, downloadable music and video as well as the ability to transfer files created by so-called picture phones.

Consumer demand for network services has increased, in part, by the ability to obtain prepaid services, which is service that is paid for before it's used. Many cellular telephone service providers sell phones, the price of which includes a finite amount of service that will be provided to the phone after it has been purchased. By selling services prepaid, network service providers realize income at a substantially reduced risk of loss attributable to services provided to phones that have been lost by or stolen from their owners or services provided to subscribers who fail to pay for the services after they are provided.

In prior art prepaid service schemes, an initial or starting balance or initial credit of a network client device, such as a cellular phone, is pre-loaded into an account database by the service provider. As network services are provided to a client device over time, the account balance for the client device is debited as services are provided. When the account balance is zeroed, network service to the device is cut off.

A problem with prior art prepaid network service schemes is that they require the service provider to operate and maintain a database that maps a physical entity or a network agent to at least one account that is assigned to each network agent. A network agent refers to a client device such as a cellular telephone, a two-way radio, a personal digital assistance, a MP3 player, etc.

Those of ordinary skill in the art appreciate that there are drawbacks to maintaining a database of network services that are owed by a service provider to a network agent. Among other things, each service provider needs to maintain its own central authorization, charging, and rating database for each network agent. In a cellular telephone network, the maintenance of such a database includes mapping each cellular telephone to a phone number and area code. It also requires tracking and updating account balances. Further, if a user of a prepaid handset moves to an area outside the pre-defined location, the prepaid solution may require additional messages from the visited network to the home network. Since prepaid solutions are unique to each service provider, there is no easy way to set up a central clearinghouse to reconcile cross charges between service providers in real time. Several examples of prepaid network services that employ a database with pre-paid subscriber information are disclosed by Fougnies, et al (U.S. Pat. Nos. 5,722,067; 5,854,975; 6,157,823; 6,236,851; U.S. Patent App. Pub. No. 2001/0021648).

A method and apparatus by which network services are provided to a network agent at a reduced computational overhead to the network would be an improvement over the prior art.

DETAILED DESCRIPTION

Instead of providing network services using schemes that store network agent account balance(s) within the network, prepaid network services are advantageously provided by a method and apparatus wherein network agents store information that identifies the network agent to the network and which also identifies the network agent's account balance. Put another way, network services can be granted or denied to a network agent based on data stored within the network agent, instead of data that is stored within the network.

Figure 1:
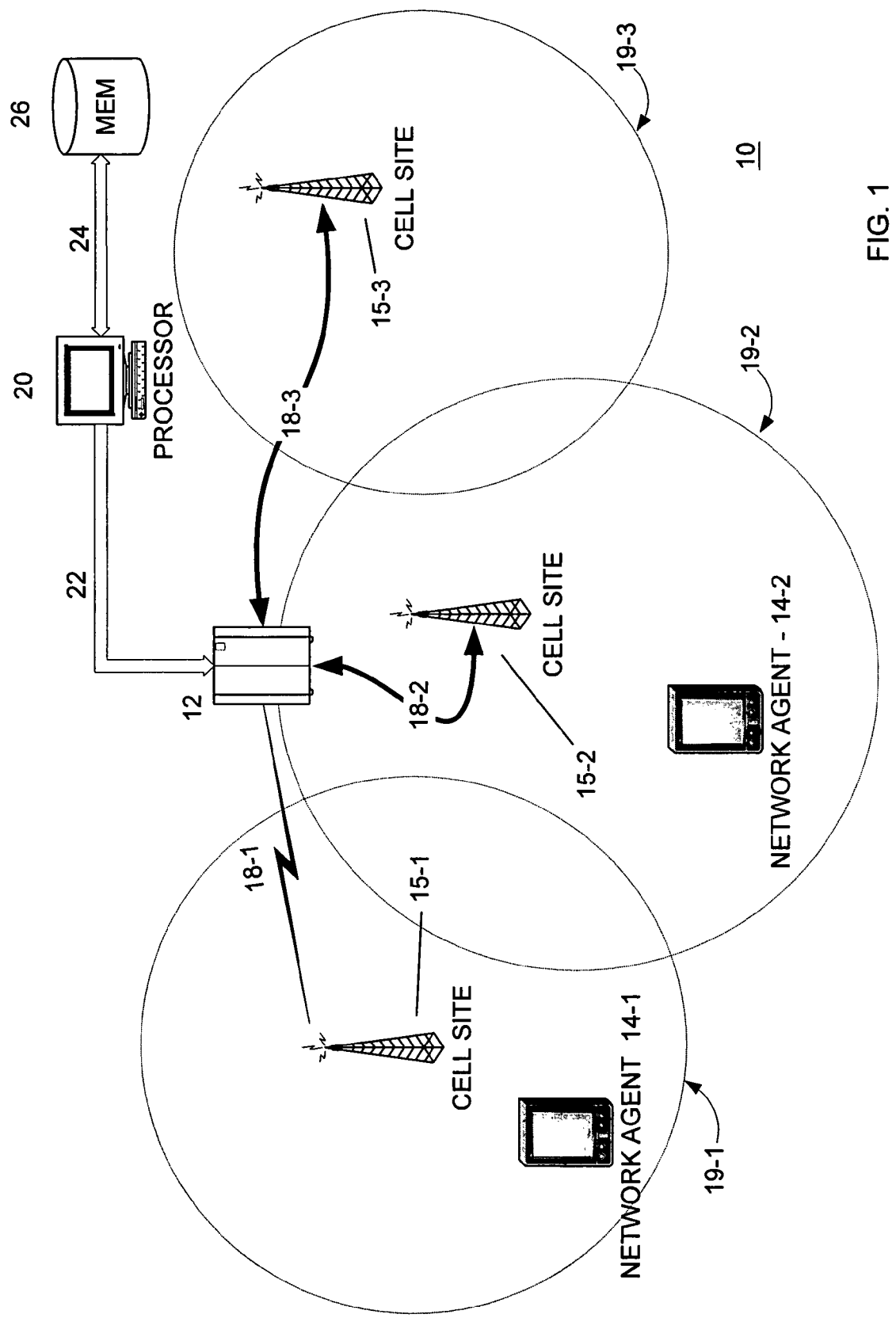
FIG. 1 is a representation of a network that provides wireless services to network agents, in accordance with an embodiment.

FIG. 1 is a representation of a wireless communication network 10 comprised of a switching system 12, one or more processors 20 that controls the switching system 12 and one or more cell sites 15 (e.g., 15-1, 15-2, 15-3, etc.), through which various kinds of services are provided to subscribers or end users, in accordance with an embodiment. Examples of services provided by the network 10 include cellular telephone service to cellular telephones. Other types of services provided by the network 10 include but are not limited to two-way dispatch radio services, instant messaging service, global positioning data services, MP3 file download service and Internet access.

Regardless of the type of service provided by the network 10, the network services are provided to devices that are referred to herein as network agents 14. A network agent 14 may be a cellular telephone, two-way radio, personal digital assistant, a wireless laptop, MP3 player, other subscriber equipment, etc., or combination thereof. FIG. 1 shows two network agents 14, which are identified in FIG. 1 by reference numerals 14-1 and 14-2.

The network agents 14-1 and 14-2 are not considered to be part of the network 10. The network agents 14-1 and 14-2 are constructed to receive or access service(s) provided to them by the network 10.

The network 10 depicted in FIG. 1 provides one or more network services to network agents 14 that happen to be within the geographic area or "cell" 19 (e.g., 19-1, 19-2, 19-3, etc.) of one or more of the cell sites 15.

In general, the network 10 can provide services to network agents 14 within range of one or more of the cell site towers 15, if a network agent 14-1 or 14-2 is known to or identifiable to the network 10 and the network agent 14-1 or 14-2 is determined to be entitled to receive network service. Whether a network agent 14 is known to the network 10 is determined by the network agent 14-1 or 14-2 transmitting, to the switching system 12, data that identifies the network agent 14 to the switching system 12. Network agent-identifying data is referred to herein as "authorization information." Authorization information of a network agent 14 that is sent to the switching system 12 can include the electronic serial number or "ESN" and the mobile identification number or "MIN" of a cellular telephone. Other forms of authorization information sent to the switching system 12 from a network agent 14 could include strings of alpha-numeric characters or tones or one or more words that are uttered by a person who is using the network agent 14, and that are recognized by the switching system 12. Before network services are provided to a network agent 14-1 or 14-2, the switching system 12 tests the authorization information it receives from the network agent 14 to determine whether it recognizes the network agent 14. If the authorization information from the network agent 14 matches authorization information stored within the switching system 12, the switching system 12 can then determine whether to provide service based on additional information that it receives from the network agent 14.

As described above, the network service scheme disclosed in U.S. Pat. No. 5,722,067 to Fougnies, et al, requires, among other things, establishment of a subscriber account in a central database for the phones served by the network, validation of an account balance for the phone prior to making a call, decrementing the account balance and terminating a call when the account balance is insufficient. U.S. Pat. No. 5,854,975 to Fougnies et al. discloses a network service scheme whereby an account balance can be increased, but the '975 patent also requires the establishment and maintenance of a central database for phones serviced by the network. U.S. Pat. No. 6,236,851 to Fougnies et al. discloses a method for adding money to an account balance but the method of the '851 patent also requires the data for the account being added-to to be "at the wireless service provider." U.S. Pat. No. 6,157,823 to Fougnies et al. discloses a method of completing prepaid wireless calls that requires access to a central database by a computer before a call can be completed. Published U.S. patent application number 20010021648 also requires a central subscriber database to be accessed by a computer.

Unlike other pre-paid service schemes, the network agent 14 in the embodiment of FIG. 1 stores account balance information, which the network 10 uses to determine whether the network agent 14 is entitled to receive network services. Information stored in a network agent 14, and by which the network 10 can determine the network agent's 14 right to receive network services, is referred to herein as network usage allowance information. Upon receipt of the network usage allowance information from the network agent 14-1 or 14-2, the network 10 determines whether the information from the agent 14-1 or 14-2 is valid or agrees with service usage information stored within the network 10. Thus, the network usage allowance information provided to the network 10 from the network agent 14 determines whether the network agent 14-1 or 14-2 should be granted network service.

Examples of network usage allowance information stored within a network agent 14 include an initial or starting account balance as when a network agent 14 is first purchased. Network usage allowance information stored within a network agent 14 can also include a date and/or timestamp of when it last accessed a network 10 or when it was last provided network services. Network usage allowance information can also include an encrypted or unencrypted alphanumeric key or code or any other data that can be stored by the network 10 so that it can be retrieved at a later date to be compared against network allowance data received by the network 10 from a network agent 14. Network usage allowance information can be increased as well as decreased, as when a user pays a service provider for additional network services. So long as a network agent's 14 network usage allowance information agrees, matches, conforms to, complies with or otherwise qualifies the network agent 14 for service, network service can be provided by the network 10 to an agent 14-1 or 14-2. Network usage allowance information from a network agent 14 is determined to agree with, match, conform to, comply with or otherwise qualify a network agent for service, by a comparison of the service usage allowance information stored in the network agent 14 to actual service usage information for the network agent 14 that is stored in the network 10.

Wireless services provided to network agents 14 by the network 10 vary and can include, for example, two-way wireless or cellular telephone service. Other services provided by the network 10 can include Internet access, instant messaging, MP3 or other format music files, video and/or personal digital assistant (PDA) e-mail services, etc.

As shown in FIG. 1, the network 10 includes a switching system 12 operatively coupled to various cellular telephone sites or "cell sites" 15 through appropriate data links 18 (e.g., wireless data link 18-1 or hard-wired connections 18-2 and 18-3 between the switching system 12 and the cell sites 15. The switching system 12 that controls the services provided to network agents 14 through the cell site 15 is coupled to and controlled by one or more processors or computers 20 through an appropriate bus or data link 22.

As is well known to those of ordinary skill in the computer art, the processor 20 that controls the switching system 12 is imbued with functionality and capability by executing program instructions stored in a memory storage device 26 coupled to the processor 20 by a bus 24. The memory device 26 can be implemented using one or more different types of memory devices. By way of example and not of limitation, the memory device 26 could be implemented using combinations of semiconductor random access memory or RAM, read-only memory or ROM, electrically programmable or electrically erasable programmable read-only memory (EPROM and EEPROM respectively) and the like. The memory 26 could also be implemented using one or more magnetic discs or optical disc storage devices with or without RAM, ROM, EPROM or EEPROM devices as well. In addition to storing program instructions, which when executed enable the processor to control network hardware, the memory device 26 can also be used to store authorization information and network usage allowance information.

When the program instructions stored in the memory device 26 are executed, they cause the processor 20 to control the equipment that is peripheral to the processor 20, namely the cell sites 15 and the switching equipment 12. In particular, the instructions in memory 26 cause the processor to control the switching equipment 12 to receive service requests from network agents 14 and to pass the data in those requests to the processor 20.

The processor 20 evaluates service requests from network agents 14, including the previously mentioned service authorization information, which the processor 20 receives from a network agent 14-1 or 14-2 requesting service. If authorization information obtained by the network 10 from a network agent 14-1 or 14-2 agent agrees with network agent information stored within the network 10, program instructions stored within the memory device 26 cause the processor to grant network service to the agent 14 if there is agreement between data stored within the memory 26 that specifies the service to be provided to the network agent 14, and data received from the network agent 14 that specifies what services the network agent 14 is entitled to receive.

When network services are granted to a network agent 14, the processor 20 tracks the amount, type, time or value of network service provided to the network agent 14 so as to "charge" the value of the service provided to the network agent's 14 account. As the network service value is used up by the network agent 14, the processor 20 sends new service usage allowance information to the network agent 14, which reflects the service that was provided. When the network agent 14 receives the updated network service usage allowance information from the network 10, the network agent 14 stores the network service usage allowance information within itself.

On subsequent attempts to obtain network service, the network 10 will grant service to the network agent 14 when data that identifies a network actual service usage stored within the network 10, matches the data that identifies the network agent's 14 service usage received by the network 10 from a network agent 14 when the network agent 14 next attempts to obtain service. Put anther way, network services are granted or denied to a network agent 14 by the network 10 as described above, based on a concordance of or agreement between network usage allowance information obtained from the network agent 14, to network usage allowance information stored within the network 10. By way of example, if network agent 14-1 is a cellular telephone, when it requests service it sends its ESN and MIN to the network 10. After sending its ESN and MIN, the phone will also send its network usage allowance information. When the network 10 receives the ESN and MIN sent to it by the network agent 14-1, the ESN and MIN are tested to see if they are valid and recognized. They are also used to identify the actual service that has been provided to the phone. If the network's 10 record of actual service provided to the phone agrees with the phone's record of service to which it is entitled, service can be granted by the network 10.

In an embodiment, data stored in the network 10 that identifies a network agent's 14 actual service usage is a timestamp of when a network agent 14 terminated a network session. Data that identifies a network agent's 14 actual service usage can also include a running total or summation of network service provided to the network agent 14, or a total of other services provided to the network agent 14. In another embodiment, data that identifies a network agent's 14 actual service usage need not be data that pertains or relates to service. Data that identifies a network agent's 14 actual service usage can be a numeric key that uniquely identifies a phone to an ESN/MIN combination. Such a key can be sent by the network 10 to the network agent 14 at the termination of a session.

Figure 2:
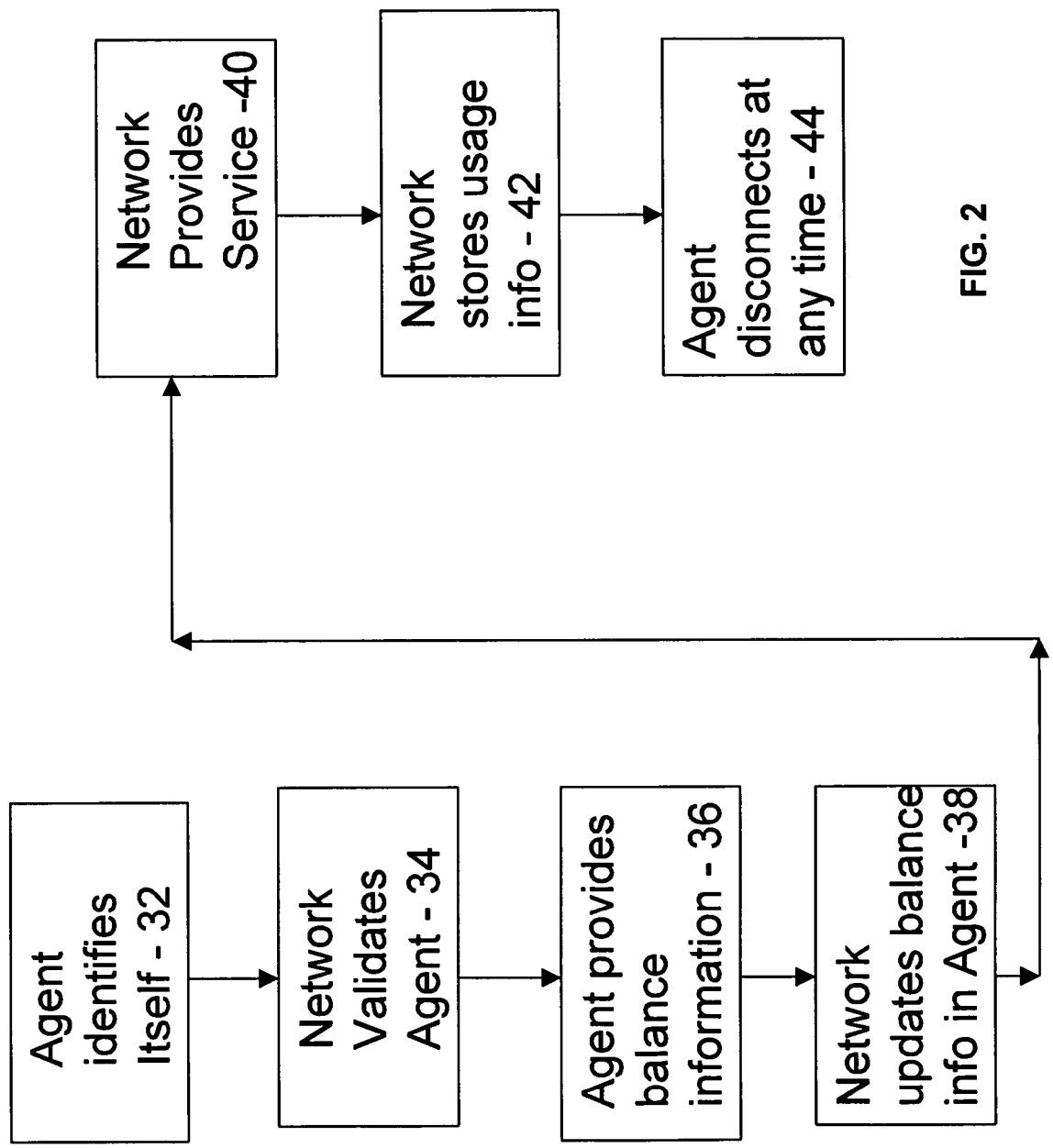
FIG. 2 is a diagram of a method of providing network services to a network agent, in accordance with an embodiment.

FIG. 2 depicts steps of a method 30 by which network services are provided to a network agent 14, in accordance with an embodiment.

In step 32, as set forth above, the network agent 14 identifies itself to the network 10 by sending its "authorization information" to the network 10. In the case of the network agent 14 being a cellular telephone, step 32 is comprised of the phone's transmission of an ESN and MIN to the network 10.

In step 34, the network 10 validates the authorization information it received from the network agent 14, typically by accessing a table wherein authorization information for network agents 14 known to the network 10, is stored. In step 36, the network agent 14 transmits to the network 10, network usage allowance information that was stored within the network agent 14. As in an embodiment described above, the network usage allowance information stored within the network agent 14 is data that identifies, shows or establishes the amount, time, value or duration of network service that the network agent 14 is entitled to receive, which amount was last updated by the network 10 when the network agent 14 last accessed the network 10 for service.

In step 38, the network 10 compares network agent balance information received from the network agent 14 in step 36 with the network agent's 14 actual service usage information, which is stored within the network 10. If at step 38 the information from the network agent 14 matches or agrees with the information in the network 10, service is provided to the network agent 14 by the network 10 at step 40. In step 42, the network 10 updates the network agent's 14 usage and the usage information for the network agent 14 that is stored into the network agent 14 as service is provided or when service is terminated.

In step 44, the network agent 14 disconnects or ends its network session, having received from the network 10 and stored within the network agent 14, an update of the network agent's 14 network service usage, which is stored in the network agent 14 as the network usage allowance information that remains.

Unlike other prepaid service schemes, which require the network 10 to maintain a database of network service account balances, the method and apparatus disclosed herein keeps network account balance information in the network agent 14. The network 10 does not keep track of account balance. The network 10 keeps track of when a network agent 14 last accessed or was last provided service and downloads that data into the network agent 14. When a network agent 14 next requests service, the network agent 14 uploads its copy of its service requests to the network 10, which the network 10 compares to its record of service access provided to the network agent 14. When these two data agree, service can be provided.

Figure 3:
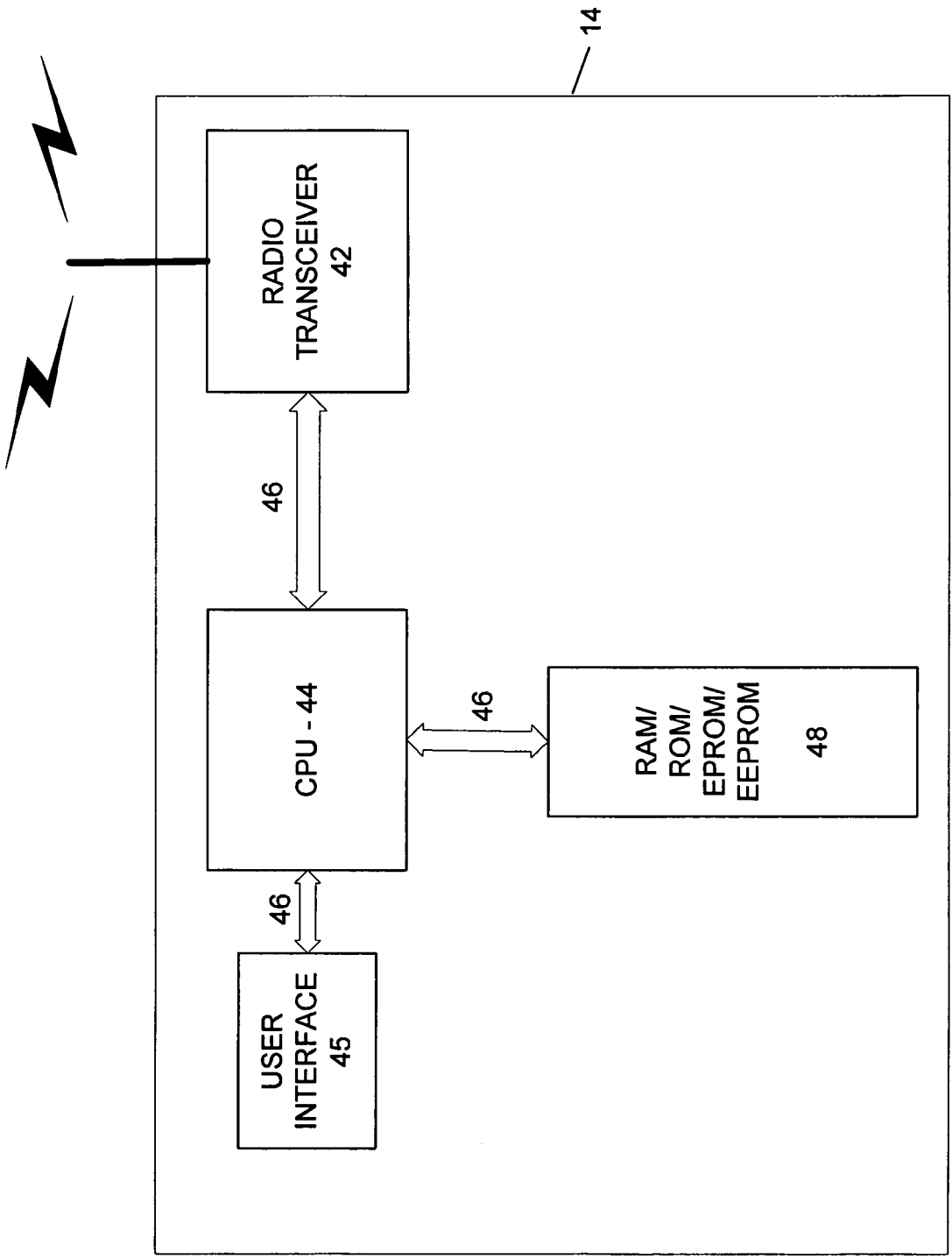
FIG. 3 depicts a representation of a network agent, in accordance with an embodiment.

FIG. 3 is a block diagram of a network agent 14, in accordance with an embodiment. In this embodiment, the network agent 14 has a radio transceiver 42, which provides a communications link between the network agent 14 and communications infrastructure of a network 10. The transceiver 42 is operatively coupled to a processor or CPU 44 through a bus 46. The CPU 44 controls the radio transceiver 42 portion of the network agent 14. It also controls a user interface 45, typically embodied as a keypad, speaker, microphone and display device, such as an LCD screen, all of which allow a user of the network agent 14 to enter commands and/or send and receive information.

The CPU 44 is also coupled to a memory device 48 through the bus 46. The memory 48 stores the aforementioned network authorization information and network usage allowance information. The memory 48 also stores program instructions, which when executed by the CPU 44 imbue the CPU 44, and hence the network agent 14, with functionality and features described above.

Instructions stored within the memory 48 cause the CPU 44 to send the aforementioned network authorization information and network usage allowance information to the network 10 via the radio transceiver 42. Instructions in the memory 48 also cause the CPU 44 to access network services via the transceiver 42 and to route the network services to a user of the network agent 14 via the user interface 46.

Prior to the termination of a network session, program instructions within the memory 48 also cause the CPU 44 to receive, recognize and accept from the network 10 through the radio transceiver 42, service usage allowance information from the network 10 and to store the updated information in the memory 48 for the next network service request.

While the method described above is with regard to a cellular telephone services and cellular networks, the method is equally applicable to other types of services and networks. The method is equally applicable to other types of two-way communications, such as two-way dispatch and trunking networks, instant messaging and Internet access. It is also applicable to services that provide downloadable video and audio files. Accordingly, the network agent 14 described above could therefore also be a two-way dispatch radio, a data terminal through which text messages are exchanged or through which web pages can be displayed. The network agent 14 could also be an MP3 player or a video terminal through which video files can be displayed. In an alternate embodiment, the network agent 14 could also be a digital camera, sold with an ability or right to have a certain number of pictures printed for free or as part of the camera's purchase price at camera printing kiosks. In such an embodiment, the digital camera would have a balance (e.g., a number of free pictures granted or left) and the printer kiosk would run a program (e.g., a printer driver) that would take care of decreasing the number of pictures to be printed by one, and thereafter update the camera's "balance" by downloading the new balance into the camera.

In the embodiments described herein, data downloaded into a network agent 14 by a network 10 (or kiosk for example) may be encrypted so as to limit or prevent theft of services. Data encryption techniques are well known and a discussion of data encryption techniques that could be used with the data that is downloaded into a network agent 14 as described herein is omitted for brevity.

As set forth above, the authorization information stored within a network agent 14 can include the ESN and MIN of a cellular telephone. In alternate embodiments, the authorization information could also include a personal identification number or PIN, selected by a user, determined by the network 10, the manufacturer of the network agent 14 or assigned or determined by the network service provider or other third party.

The network usage allowance information stored within a network agent 14 can take many forms. When a network agent 14 first accesses a network 10, the network usage allowance information can include data that represents an initial account balance for the network agent 14. The balance of an account can be in terms of the value or cost of network service, the amount of network service time to be provided or the volume or number of network services to be provided, such as a number of video or audio files that can be downloaded or a volume of data sent or received. As service is provided to the network agent 14, the network usage allowance information will be adjusted to reflect the network service provided to the network agent 14. As set forth above, network allowance information can be increased, such as when a user purchases additional pre-paid network service.

The network usage allowance information can also be embodied as a timestamp that identifies when the network agent 14 last accessed or last terminated its connection with the network 10. In alternate embodiments, the authorization information as well as the network usage allowance can also be embodied as a security code or data, such as an encrypted or unencrypted rolling or pseudo-random code word.

Regardless of the exact form of the network usage allowance information stored within the network agent 14, when the network agent 14 next accesses a network, the network 10 will test the authorization information and the usage allowance information prior to granting service. If the data from the network agent 14 matches corresponding data in the network 10, service can be granted, otherwise it can be denied.

As used herein, the data from the network agent 14 and data in the network 10 is considered to match or agree when there is an exact match or when the difference or disparity between the two data copies is below a threshold determined by a service provider. For example, in embodiments where the network 10 updates service usage allowance information to the network agent 14 at the termination of a session, power to the network agent 14 might be unexpectedly lost before the network agent 14 can receive and store the updated data. Signals from a network cell site 15 might be lost as the network agent 14 goes beyond the coverage area 19 or when the network agent 14 goes into a building or tunnel where signals are lost. In such instances, the network agent's 14 copy of its usage allowance information might not match the network's 10 copy of actual usage information when the network agent 14 next attempts to obtain service. When the difference or disparity between the two data copies is below a predetermined limit, for example, a few dollars or a few air time minutes, the network 10 can still grant service and update the network agent's 14 usage during the ensuing network session.

What is claimed is:

1. A method of providing network services to a network agent separate from a network and located on a mobile device, comprising:
   a) storing authorization information and network service usage allowance information within the network agent on the mobile device separate from the network;
   b) storing the authorization information and actual network service usage information within the network;
   c) if the authorization information obtained from the network agent agrees with the authorization information for the agent stored within the network then:
   d) updating the network service usage allowance information within the network agent with the actual network service usage information stored within the network; and
   e) granting network service to the network agent based on the updated network service usage allowance stored within the network agent.

2. The method of claim 1 wherein c) is comprised of: granting network service if network service usage allowance information agrees with actual network service usage information.

3. The method of claim 1 further comprised of:
   denying network service to the network agent when the authorization information from the network agent and network service usage allowance information obtained from the network agent disagree.

4. The method of claim 1, wherein the authorization information is comprised of data that identifies the network agent to the network.

5. The method of claim 1, wherein the network service usage allowance information is comprised of data that identifies a current account balance for the network agent.

6. The method of claim 1, wherein the network service usage allowance information is comprised of data that identifies a current account balance for the network agent and a timestamp of the network agent's last network access.

7. The method of claim 1, wherein updating the network service usage allowance information within the network agent with the actual service usage data stored within the network is comprised of: storing an account balance for the network agent that is adjusted according to network usage and a timestamp of the network agent's last network access.

8. The method of claim 1, wherein updating the network service usage allowance information within the network agent with the actual service usage data stored within the network is comprised of: storing an account balance for the network agent that is increased by an account credit.

9. The method of claim 1, wherein the network services are comprised of: telecommunications services, Internet access, and instant messaging service.

10. The method of claim 1, wherein the network agent is at least one of: a cellular telephone, a personal digital assistant and an MP3 player.

11. A method for a network agent separate from a network and located on a mobile device, to obtain network services from a network, the method comprising:

a) sending to the network from the network agent on the mobile device separate from the network, authorization information and network service usage allowance information, said authorization information and network service usage allowance information being stored within and obtained from the network agent;
b) accessing services provided by the network;
c) receiving from the network, updated network service usage allowance information from the network; and
d) storing within the network agent, the updated network service usage allowance information.

12. The method of claim 11, wherein sending authorization information is comprised of sending data that identifies the network agent to the network.

13. The method of claim 11, wherein sending network service usage allowance information is comprised of sending data that identifies a current account balance for the network agent.

14. The method of claim 11, wherein sending network service usage allowance information is comprised of sending data that identifies a current account balance for the network agent and a timestamp of the network agent's last network access.

15. The method of claim 11, wherein the step of receiving updated network service usage allowance information from the network is comprised of receiving an account balance for the network agent that is adjusted according to network usage and is comprised of receiving a timestamp of when the network agent last accessed the network.

16. The method of claim 11, wherein storing within the network agent, updated network service usage allowance information is comprised of storing within the network agent, the account balance for the network agent that is increased by an account credit.

17. The method of claim 11, wherein accessing services provided by the network is comprised of accessing a service that is either a telecommunication service, Internet access, or instant messaging service.

18. The method of claim 11, wherein the network agent is at least one of:
a cellular telephone, a personal digital assistant and an MP3 player.

19. A network agent separate from a network and located on a mobile device, comprised of:
a communications device capable of wireless communications with the network;
a processor operatively coupled to the communications device;
memory, operatively coupled to the processor, said memory storing program instructions, which when executed, cause the communications device to:
a) send to the network, authorization information and network service usage allowance information, said authorization information and network service usage allowance information being stored within and obtained from the network agent on the mobile device separate from the network;
b) access services provided by the network;
c) receive from the network, updated network service usage allowance information from the network; and
d) store within the network agent, on the mobile device separate from the network, updated network service usage allowance information.

20. The network agent of claim 19, wherein said memory stores program instructions, which when executed, they cause the network agent to: send data that identifies the network agent to the network.

21. The network agent of claim 19, wherein said memory stores program instructions, which when executed, they cause the network agent to: send a current account balance for the network agent to the network.

22. The network agent of claim 19, wherein said memory stores program instructions, which when executed, they cause the network agent to: send data that identifies a current account balance for the network agent to the network and to send to the network, a timestamp of the network agent's last network access.

23. The network agent of claim 19, wherein said memory stores program instructions, which when executed, they cause the network agent to: receive an account balance for the network agent that is adjusted by the network according to network usage and is comprised of receiving a timestamp of when the device accessed the network.

24. The network agent of claim 19, wherein said memory stores program instructions, which when executed, they cause the network agent to: store within the network agent, the account balance for the network agent that is increased by an account credit.

25. The network agent of claim 19, wherein said memory stores program instructions, which when executed, they cause the network agent to: access a service that is either telecommunication service, Internet access, or instant messaging service.

26. A network that provides wireless services comprised of:
a switching system that provides network communications services to network agents on mobile devices separate from the network through a wireless communications network;
a processor operatively coupled to the switching system;
memory, operatively coupled to the processor, said memory storing program instructions, which when executed, cause the switching system to:
a) store authorization information and actual network service usage information for network agents on the mobile device separate from the network;
c) evaluate authorization information from a network agent on a mobile device separate from the network and if authorization information obtained from the network agent agrees with the authorization information for the network agent stored within the network then:
d) send updated network service usage allowance information to the network agent; and
e) grant network service to the network agent based on the updated network service usage allowance stored within the network agent.

27. The network of claim 26, wherein the actual network service usage information for the network agent is comprised of data that identifies service usage time provided by the network to the network agent.

28. The network of claim 26, wherein the actual network service usage information is comprised of data that identifies the last time network services were provided to the network agent.

29. The network of claim 26 wherein the network is one of: a telecommunications network; an Internet access network, and instant messaging network.

* * * * *